Dec. 29, 1925.                                                                 1,567,320
K. DAVIS
MACHINE FOR HANDLING AND TRANSPORTING LOOSE MATERIALS
Filed July 13, 1922          8 Sheets-Sheet 3

INVENTOR
Kenneth Davis
BY John D Morgan
ATTORNEY

Dec. 29, 1925.　　　　　　　　　　　　　　　　　　　　1,567,320
K. DAVIS
MACHINE FOR HANDLING AND TRANSPORTING LOOSE MATERIALS
Filed July 13, 1922　　8 Sheets-Sheet 7

INVENTOR
Kenneth Davis
BY
John D Morgan
ATTORNEY

Patented Dec. 29, 1925.

1,567,320

UNITED STATES PATENT OFFICE.

KENNETH DAVIS, OF ST. BENEDICT, PENNSYLVANIA, ASSIGNOR TO REMBRANDT PEALE, OF ST. BENEDICT, PENNSYLVANIA.

MACHINE FOR HANDLING AND TRANSPORTING LOOSE MATERIALS.

Application filed July 13, 1922. Serial No. 574,613.

*To all whom it may concern:*

Be it known that I, KENNETH DAVIS, a citizen of the United States, residing at St. Benedict, in the county of Cambria and State of Pennsylvania, have made certain new and useful Improvements in Machines for Handling and Transporting Loose Materials, of which the following is a specification.

The invention relates to material handling machines and more especially to a novel and useful machine having a shovel or carrier and adapted by its own traction to load itself and to transport its load and to unload itself and to new and useful features in such a machine.

Objects and advantages of the invention will be set forth in part hereinafter, and in part will be obvious herefrom, or may be ascertained through practice with the invention; the same being realized and attained through the instrumentalities and combinations pointed out in the appended claims.

The invention consists in the novel parts constructions, arrangements, combinations and improvements herein shown and described.

The accompanying drawings, herein referred to and constituting a part hereof, illustrate one embodiment of the invention, and together with the decription serve to explain the principles thereof.

Prime objects of the invention are to provide an automotive material handling machine which will load, travel, direct and unload itself, and further is controllable in all its functions from a distant station; and which is simple and sturdy in construction, economical to construct, is rapid, powerful and certain in its movements, and is very strong and compact and of relatively very small dimensions for its power and load-handling and carrying capacity. The machine is especially adapted and capacitated to operate in low-roofed and otherwise restricted spaces and areas.

In certain of its features the present invention is an improvement on those of my copending applications Ser. No. 247,240 filed July 29, 1918, and Ser. No. 445,701 filed February 17, 1921, while in other of its features it is independent of my said copending applications.

The invention, as embodied, comprises a body structure with a "shovel" or material carrier at the front thereof, preferably in fixed lateral position or relation with respect to the body of the machine, the "shovel" being of the full width and height of the machine, and with a traction or caterpillar tread at each side of the machine body.

A single motor is mounted on the machine body to the rear of the shovel, and one end of the motor shaft is directly connected by a compact and very high ratio speed-reducing power-transmitting gearing to a pusher blade which is adapted to push the load of loose material out of the shovel.

At its other end, the motor shaft is directly connected by very high ratio speed-reducing, direction-reversing, power-transmitting gearing to the two traction treads.

The two gearing mechanisms are controlled from a distant station, preferably by an electrically operated control, such as is disclosed in my copending application Ser. No. 445,701 filed Feby. 17, 1921.

Thus it will be seen, that the machine is very compact, simple, sturdy, powerful and occupies relatively small space for its load carrying and handling capacity. It is handled and manœuvred within small space, loading itself by its forward movement into the pile of material and backing or wheeling to disengage its load from the pile and discharging its load by the operation of the pusher blade, without any movement of the shovel itself relatively to the machine.

Other objects, advantages and features of the invention will be set forth primarily in connection with the following detailed description, and it will be understood that the foregoing general statement and description and the following detailed description are exemplary and explanatory, but are not restrictive of the invention.

Referring now in detail to the embodiment of the invention illustrated by way of example in the accompanying drawings, the machine is provided with a body or bed 1, upon which is mounted the motor and the actuating mechanism for the caterpillar or traction tread drive and that for the shovel pusher blade. The motor 2 is mounted centrally of the length of the body or bed, with its shaft disposed longitudinally of the bed, with the traction tread drive connected directly to the rear end of the motor shaft and with the pusher blade drive connected directly to the forward end of the motor shaft. This arrangement together with the design and structure of these actuating mechanisms, whereby an unusually high ratio of speed reduction is obtained within the required small space and without too much friction and heat, produces an exceedingly compact and powerful machine, of relatively very large carrying capacity, with rapid and facile manœuvring power, and sufficient speed whereby the machine is practical and can operate within very restricted spaces and areas and especially within small heights, that is low-roofed places, such as thin coal seams.

As a particular example, the machine has been designed and built to automatically load, transport, and discharge a load of about 500 pounds of steam coal, the machine so capacitated being 22 inches high, and 3 feet 3 inches wide, and about 6 feet, 11 inches long, over all. This example is given merely as a practical illustration of the capacity, compactness and power of the machine, and is in no wise restrictive of the invention.

In connection with the general structure of the machine, so far as already described, there are provided traction treads 3 and 4 at either side of the machine, and preferably extending practically the full length of the body or bed 1. At the front end of the machine is the shovel or material carrier 5, which is preferably the full width both of the machine bed 1 and of the traction treads 3 and 4, the shovel being fastened to arms 6 and 7, fastened to the rear of the sides 8 and 9 of the shovel, and extending backwardly therefrom along, outside of, and at the level of the traction treads. These arms are pivoted at their rear ends, and near the rear of the machine, upon the shafts or axles 10 and 11 of the rear guiding and supporting wheels for the traction treads 3 and 4. At its forward end the shovel is provided with bearing points 12 adapted to slide along the ground, mine bottom or the like. The shovel is open at the rear end, for the reason that the pusher blade 13 when in retracted position acts as a back wall for the shovel.

Referring now to the actuating means for the traction treads 3 and 4, with the objects of the invention already stated in mind, together with other objects, a compact drive direct from the motor shaft to the treads is provided giving the requisite high ratio speed reduction, with a relatively high horsepower, without objectionable friction and heating. This drive also has the ability to drive the treads either together or independently of each other, in the same or in opposite directions, or to drive either tread in either direction while the other tread is stationary, and to control this means from a distant station independently of the traveling machine, if desired.

The form of this mechanism herein illustrated and described, is shown and described in its broader aspects, in full detail in my application Ser. No. 553,252, filed April 15, 1922, and in part independently of its particular application in this machine, and a full detailed description thereof in the present application will, therefore, not be necessary, reference being had to the details of said construction in my copending application.

As embodied, a pinion 24 is fixed on the rear end of the motor shaft, and held in place by a nut 25. Meshing with the pinion 24 is a beveled gear ring 26, fixed on a housing 27, constituting a single drive for both the treads, the independent controls for the movements of the machine already referred to being interposed between this point and the two traction treads.

Figure 3:
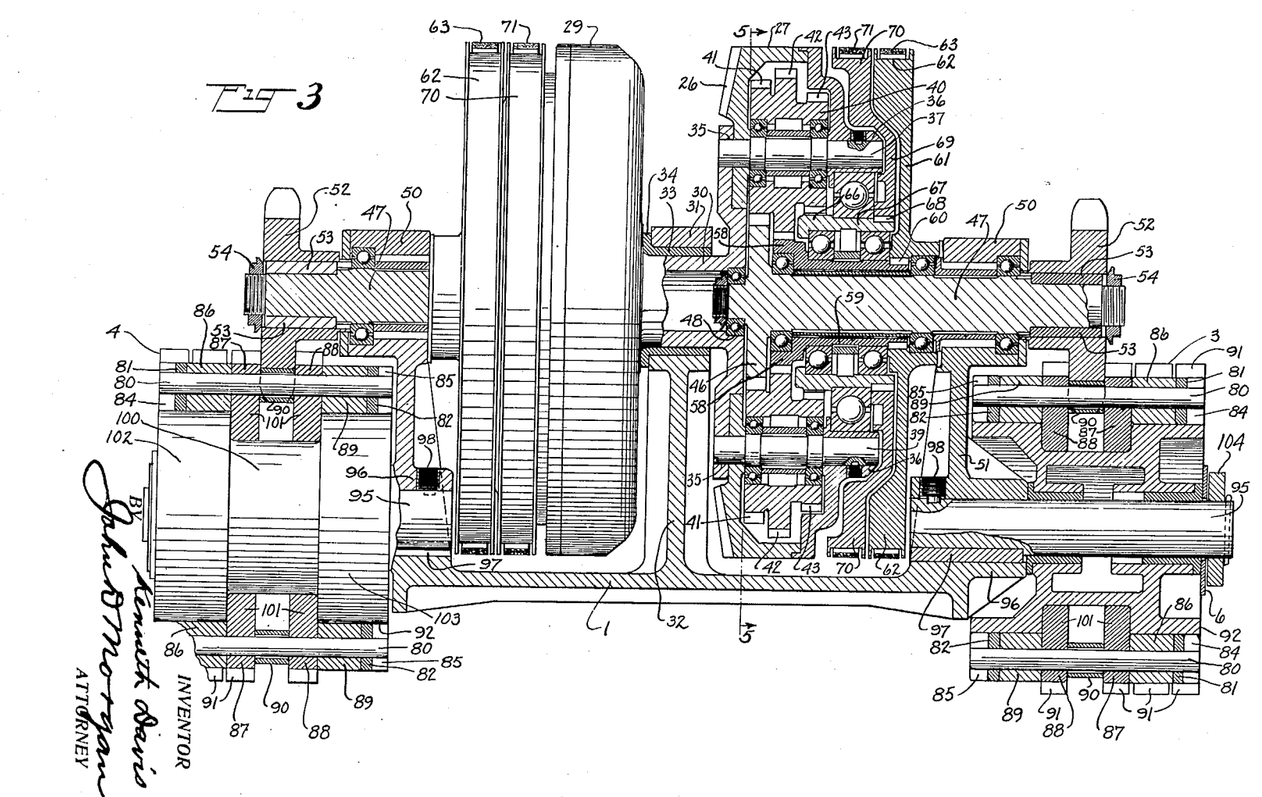
Fig. 3 is an enlarged transverse vertical section taken on the line 3—3 of Fig. 2 and Fig 5.

In Fig. 3 this power-transmitting, speed-reducing and direction-reversing mechanism is shown with one half mostly in section and the other half mostly in elevation. The housing driven by the gearing 26 is double, the part 27 enclosing the gearing for driving the traction tread 3, and the part 29 enclosing the gearing for driving the traction tread 4. These two parts of the housing are connected together by the intermediate, and preferably integral, cylindrical part 30, which causes the housing members to rotate together, and provides a journal bearing therefor.

This hollow central cylindrical part 30 is journaled in a bearing 31, carried on a pillar 32 fixed to and extending upwardly from the bed of the machine. There is an interposed bushing 33 in the bearing having a flange 34 for taking the thrust from the gearing 24 and 26. Supported at 35 and 36 in each part of the housing are a plurality of pinion carrying shafts, preferably three in number, 37, 38, and 39, upon which are rotatably carried, respectively, three triple pinions 40, each having three sets of concentric gear teeth or rings 41, 42 and 43. The annual series of gear teeth 41 of each pinion are of less diameter than the gear teeth 42 and of greater diameter than the gear teeth 43.

Meshing with the gear teeth 41 is a gear wheel 46, fixed on a shaft 47, the inside end of this shaft having a bearing 48 within the cylindrical portion 30 of the housing. At its outer end, this shaft 47 has a bearing 50 on a standard 51, which standard extends upwardly from the bed 1 of the machine. On the end of the shaft 47 is a sprocket wheel 52, fixed thereto by keys 53, and held thereon by a nut 54, the sprocket wheel meshing with the corresponding traction tread 3 or 4, the detailed construction of which will be later described.

Meshing with the gear 42 is a gear wheel 58, fixed to a sleeve 59, which loosely encircles shaft 47, and which is connected by a key 60 to a radially extending disc 61. Preferably integral with or fixed to disc 61 is a brake drum 62, with which cooperates a brake band 63, adapted to hold the drum against rotation or to let it run free.

Meshing with the gear teeth 43 is a gear wheel 66, fast to a sleeve 67, encircling and rotating loosely on the sleeve 59, this sleeve 67 being fixed by a key 68 to a disc 69. Disc 69 carries a brake drum 70, with which cooperates a brake band 71, adapted to hold the brake drum 70 against rotation, and therewith its gear wheel 66, or to allow them to run free. The entire mechanism is provided with ball bearings as fully described in my copending application Ser. No. 553,252, already referred to.

The preferred form of actuating means for each of the brake bands is a solenoid, one for each brake band, as will be later described in detail, and this solenoid may be operated from a stationary and distant controlling station, as disclosed in my copending application Ser. No. 445,701, filed Feb. 17, 1921.

In the operation of this drive for the traction treads, it will be understood that when both brake bands are free, and the pinion 24 is running, the load will hold shaft 47 and gear wheel 46 stationary, and the pinions will run around idly on the gearing, the brake drums 63 and 70 being free to rotate from the difference in circumference of the respective pinions, that is, the three sets of gear teeth on the triple pinion.

When brake drum 62 is held, its gear wheel 58 will be held stationary therewith, and as the triple pinion revolves about the centre of shaft 47, it will also rotate about its own axis at proportionate speed by reason of gear teeth 42 meshing with the stationary gear wheel 58. The smaller pinion 41 will revolve at the same angular rate about the centre of shaft 47, but due to its lesser periphery, there will be a corresponding and compensating plus rotation of shaft 47, which will drive the corresponding traction thread 3 or 4 in a given direction.

If the brake bands on the opposite side are free the other thread will not move, but if this same brake band on the opposite side be tightened to hold its drum, the other thread will travel in the same direction. On the contrary, if the other brake band on the opposite side be held, the other tread will travel in the opposite direction.

When the brake drum 70 is held by its brake band 71, its gear wheel 66 will be held stationary therewith. As the tripple pinion is revolved about the centre of shaft 47 by the gear 24, the gearing 43 thereof will rotate correspondingly about its shaft 37 by reason of its meshing with its stationary gear wheel 66. The gearing 41 of the triple pinion will revolve therewith at the same angular speed about shaft 47, but by reason of its greater periphery there will be a concurrent and compensating minus rotation of the gear wheel 46 and therewith of shaft 47, which will drive the tread in the opposite direction than when the drum 62 is held.

Thus it will be seen that the machine may be driven either forwardly or backwardly, may be wheeled either sharply or slowly, either to the right or the left and in either the forward or backward direction, as may be desired, through the selective operation of the brake bands on the brake drums, and that these may be operated either directly or from a distance.

Referring now to the details of construction of the traction treads 3 and 4, the treads comprise crossrods 80, these crossrods being connected together at either end by links 81 and 82, there being retaining pieces 84 and 85 at the ends of the rods. Mounted on the rods also are a plurality of spacing blocks or links 86, 87, 88 and 89, with an intermediate spacing roller 90. The teeth of the sprocket drive wheels 52 mesh in the spaces between these rollers 90 to drive the tread.

Certain of the links and spacing blocks are provided with ground or bottom gripping members 91. The traction treads run over guiding and supporting rollers 92, 93, and 94, mounted respectively on shafts 95, which are fixed in hubs 96, formed on the bed plate of the machine, the hubs being held by keys 97 and clamping screw 98.

Mounted on these shafts, respectively, are the guiding and supporting wheels already referred to, these wheels having a depressed or lesser central cylindrical portion 100, the members 87 and 88 of the treads having inwardly extending and spaced-apart portions 101 adapted to fit within these depressed portions 100 of the wheels, the wheels having exterior portions 102 and 103 of greater diameter upon which the laterally inner and outer members of the tread rest peripherally. Washers 104 retain the wheels upon their shafts together with linch-pins 105.

Figure 1:
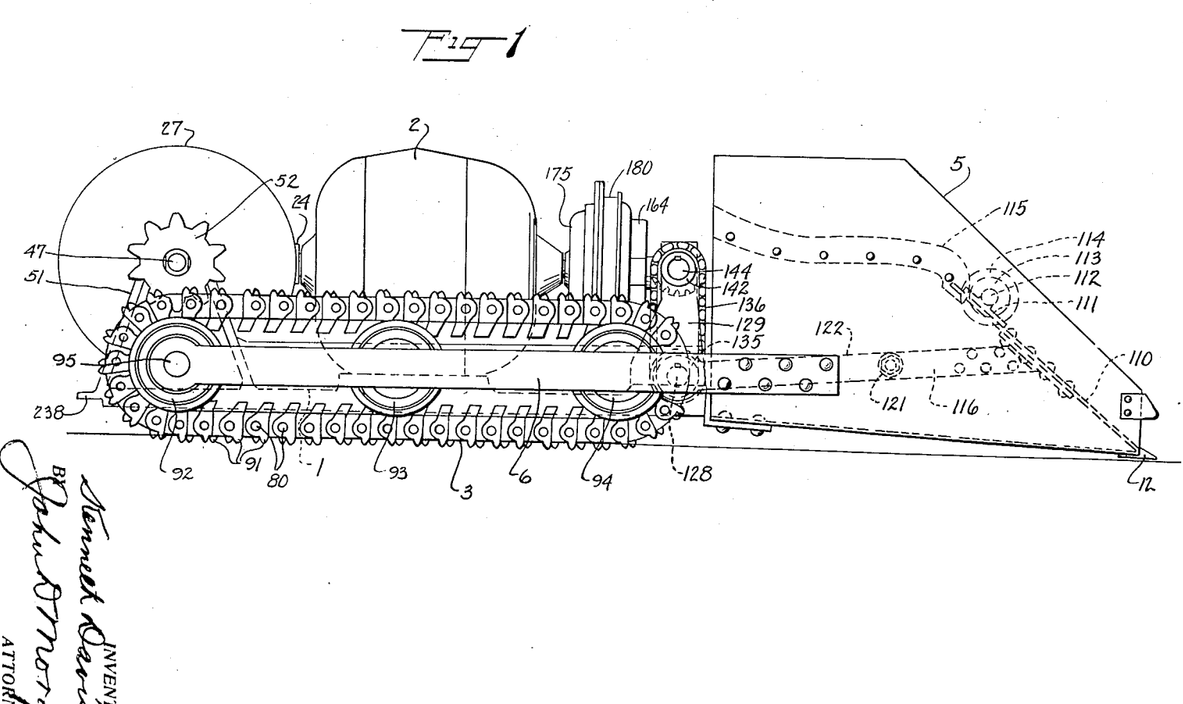
Fig. 1 is a side elevation of a machine embodying the invention.
Figure 2:
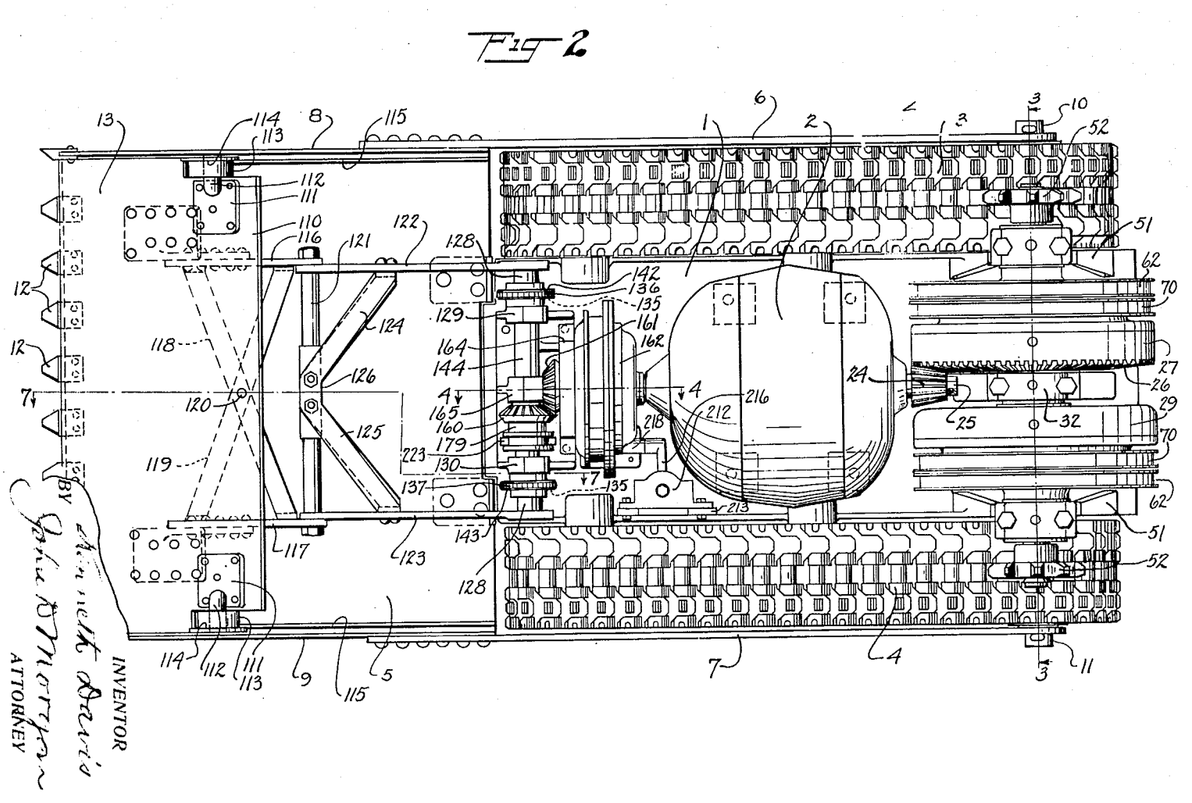
Fig. 2 is a top plan corresponding to Fig. 1.
Figure 7:
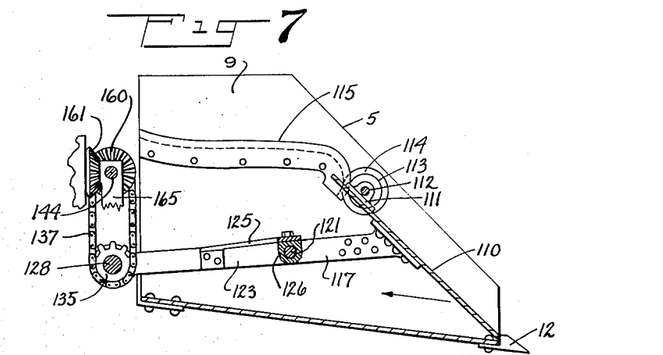
Figs. 7, 8 and 9 are fragmentary longitudinal central sections, taken substantially on the line 7—7 of Fig. 2, showing the pusher blade of the shovel and its actuating mechanism in three different positions.
Figure 8:
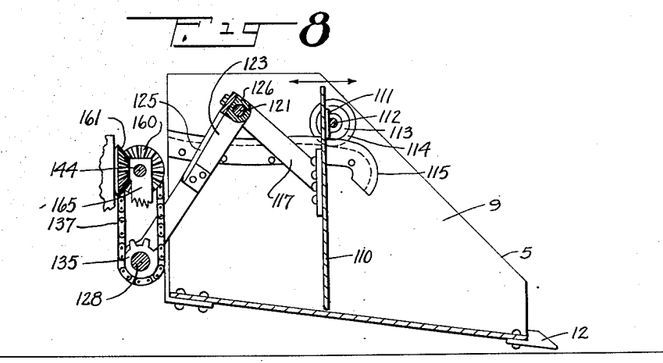

Referring now to the embodied form of drive for the pusher blade within the shovel, and to the guiding and actuating means therefor (Figs. 1, 4, 6 and 7 to 9), the blade is shown in Figs. 1, 2 and 7, at the forward end of its stroke when it has expelled all the material from the shovel. In Fig. 8 it is shown midway of either its forward or backward movement, and in Fig. 9 it is shown in its retracted position, where it forms the back of the shovel, and is behind all the loose material within the shovel when loaded, in position to push it all out at a single stroke.

In the embodied form, a blade 110 extends substantially entirely across the interior of the shovel, and is preferably of substantially equal height with the highest part of the shovel sides. At its sides and near the top thereof, the blade 110 has fixed thereto plates 111, respectively, having stub shafts 112, upon which are rotatably mounted rollers 113 running on guide rails 115, and having flanges 114, which run in the space between the guide rails and the corresponding side of the shovel. These guide rails or trackways 115 are shaped so that in connection with the actuating means for the pusher blade, the latter will have the proper motions and positions as outlined in the drawings.

Fixed to the back of the shovel, at either side thereof, are a pair of arms 116 and 117, provided with cross braces 118 and 119, which are pivoted together at 120. At their outer end the arms 116 and 117 are pivoted to a rod 121, extending across between them. The rod 121 is carried loosely in a pair of arms 122 and 123, cross braces 124 and 125 being fixed to these arms and to a central block 126, apertured to loosely receive the rod 121.

The other ends of the arms 122 and 123 are fixed to a shaft 128, journaled at 129 and 130 in supports carried on the body or bed 1 of the machine. The shaft 128 is driven by suitable means, such as sprocket wheels 134 and 135 fixed thereto over which run, respectively, sprocket chains 136, and 137, which run also over sprocket wheels 142 and 143, fixed on a shaft 144, which shaft is also journaled in the standard 129 and 130, just above the shaft 128.

There is in the present embodiment, and according to certain principles of the invention, a direct drive from the forward end of the motor shaft to the shaft 144 having a very high ratio speed-reduction, and also meeting the other requisites of this service, of which many have already been outlined.

The present preferred embodiment of this mechanism has been illustrated in detail in my copending application, Ser. No. 553,251, filed April 15, 1922, and the full details need not be shown and described in the present application.

In the embodied form (Figs. 1, 2, 4 and 6) a beveled pinion 160 is fixed on shaft 144. Meshing with pinion 160 is a pinion 161, fixed to, or integral with, a shell 162, having a cylindrical, hollow hub 163, which is journaled in a bearing 164, with certain interposed members as later described. Bearing 164 is carried upon a support 165, which also provides a journaled bearing for the shaft 144. The shell 162 has fixed to the interior thereof, by suitable means such as a key 168, an internal gear ring 166, and meshing with this gear ring are pinions 167, constituting with pinions 170 double pinions shown as three in number, although this number may be varied.

The other member 170 of the double pinions is fixed to or integral with the pinion 167 so that they will rotate together, and in accordance with certain features of the invention having in view an unusually great speed-reduction, under practical operating conditions of relatively heavy load, avoidance of undue heat generation and friction, the two pinion members are of the same pitch diameter, and their axis is in a certain definite inclined relation to the axis of the driving shaft 173, to be described later (in this case the motor shaft). The various double pinions 167 and 170 are rotatably journaled in a cage or carrier 172, which in turn is rotatably carried on the driving shaft 173, which in this instance is the shaft of the motor 2.

Figure 4:
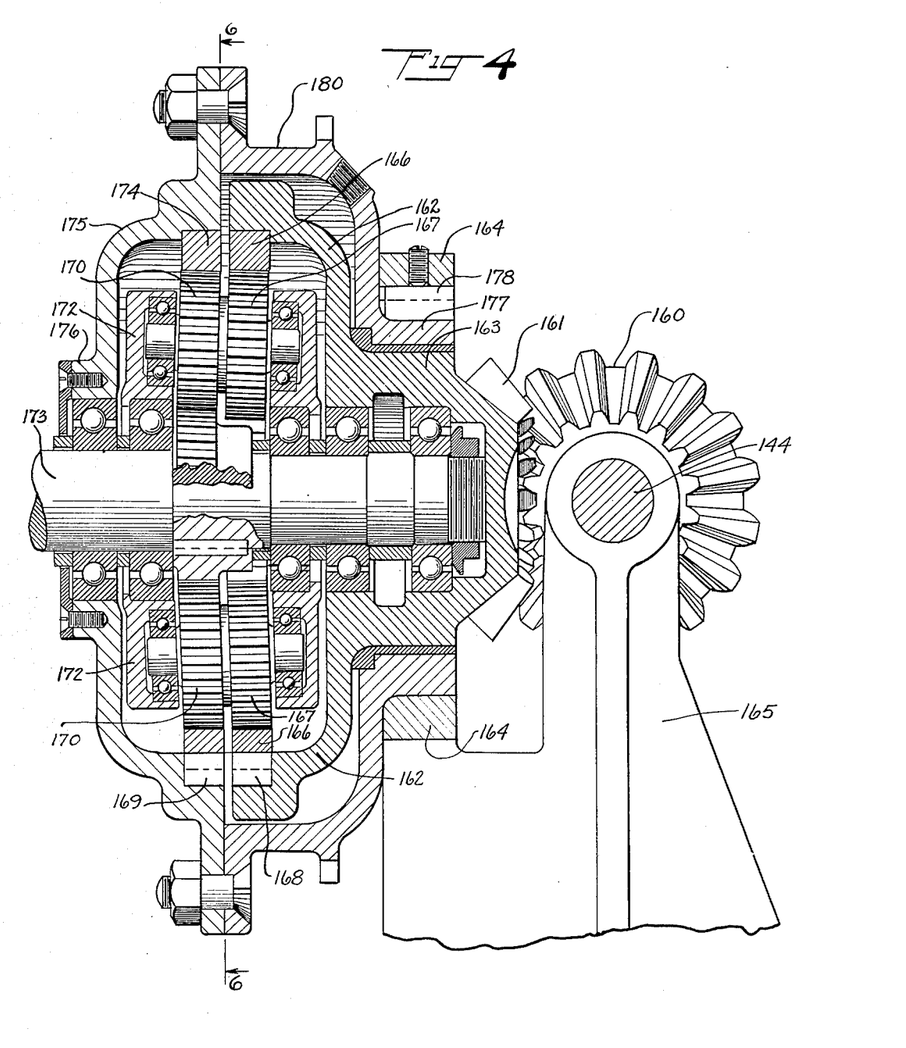
Fig. 4 is a likewise greatly enlarged longitudinal section taken on the line 4—4 of Fig. 2 and Fig. 6.
Figure 5:
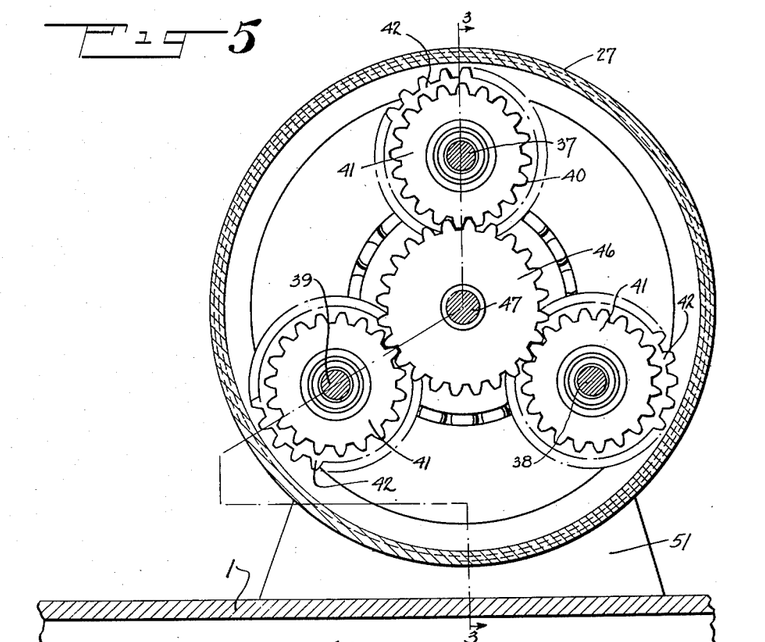
Fig. 5 is a vertical section taken on the line 5—5 of Fig 3.
Figure 6:
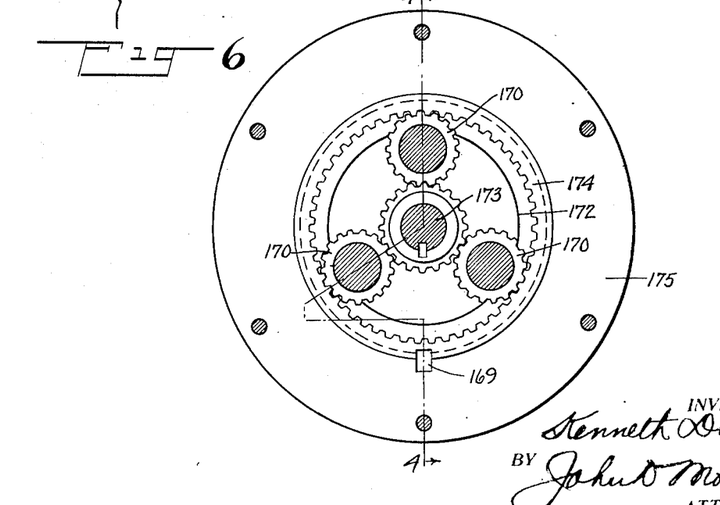
Fig. 6 is a section on a greatly reduced scale taken on the line 6—6 of Fig. 4.

Meshing with the respective pinions 170 is an internal gear ring 174, fixed by suitable means, such as a key 169, to a housing 175. Housing 175 has at one end thereof a hub 176 journaled on the shaft 173, and at its opposite end it has a hub 177 encircling the hub 163 of shell 162, already referred to. This housing is shown in Fig. 4 held in fixed position by a key 178 locking its hub 177 to the bearing 164. In this case a clutch mechanism, such as 179, may be provided on shaft 144 or on shaft 128; or a brake band may be provided for the space 180 on the housing, in which case the housing will be constructed free for rotation on the bearing 164, as described in my said copending application Ser. No. 553,251. Whether the clutch or brake be used, it may be operated by a solenoid, and be subject to the distant control shown and described in my copending application Ser. No. 445,701, already referred herein. As embodied, 179 is a collared hub for bevel pinion 160, the pinion being slid along its shaft into and out of mesh with pinion 161.

Figure 9:
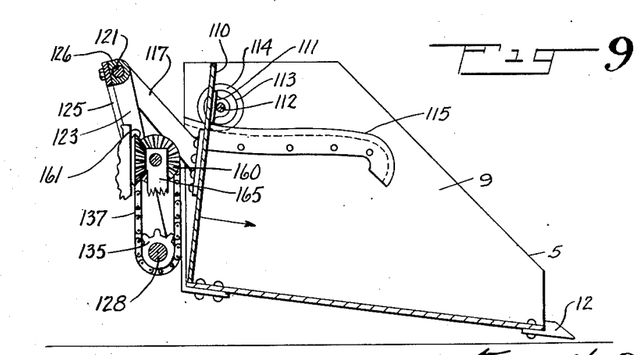

The manner of operation of the pusher blade will be clear from Figs. 7, 8 and 9 in connection with the preceding description, the blade being moved and directed and positioned through the coaction of the actuating arms and of the rollers and their trackways. The machine has a wide range of operation, under control both as to its movements and the loading and unloading operations from a central station. Under the distant control, the machine may be run up to a pile of material and driven thereinto to load the shovel, and then may be backed out, or wheeled out to either side, to separate the load in the shovel from the pile of the material. Continuing to operate under the control from the distant station, the machine may then run to a place of discharge, and the pusher blade operated to eject the load from the shovel, without any movement of the shovel or machine, and the blade retracted, and the machine then run back to the place of supply, always under said control from the distant station.

Figure 10:
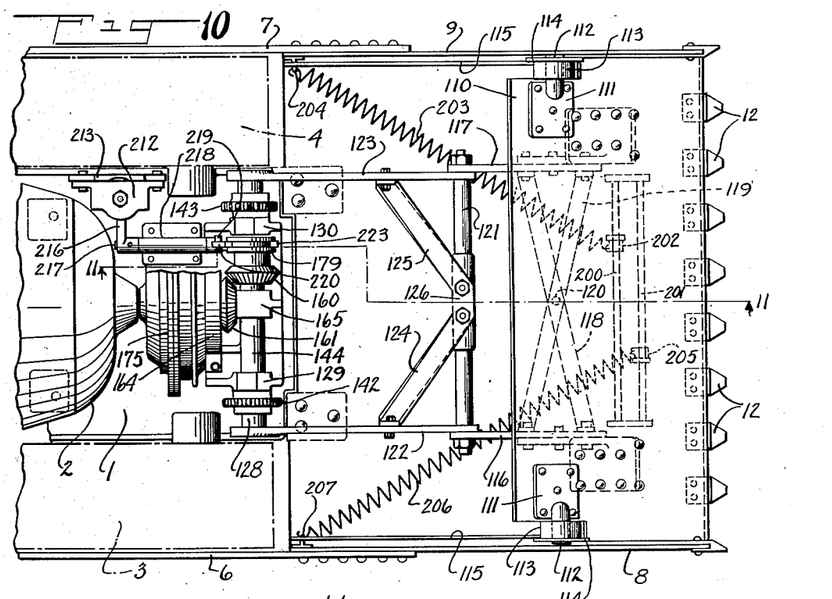
Fig. 10 is a fragmentary plan showing details of the shovel actuating mechanism.
Figure 11:
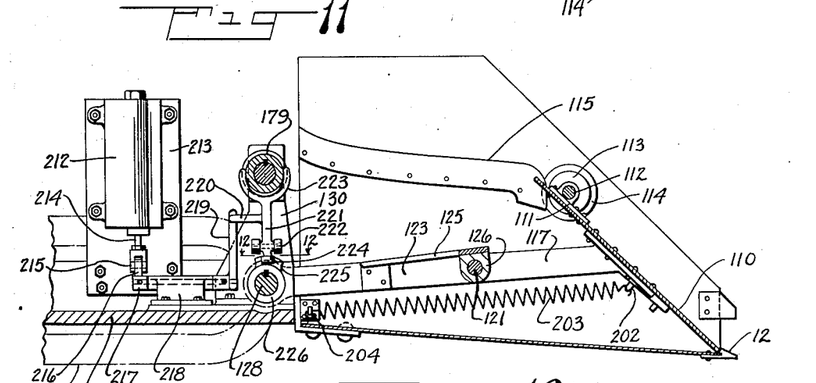
Fig. 11 is a vertical longitudinal section taken substantially on line 11—11 of Fig. 10.
Figure 12:
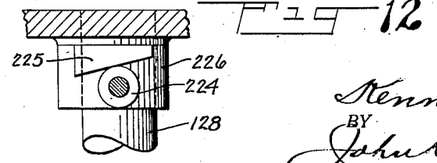
Fig. 12 is a detached, fragmentary detail, greatly enlarged, of a part of the pusher blade controlling mechanism, taken on line 12—12 of Fig. 11.

In Figs. 10, 11 and 12 are shown additional features of the present preferred form of mechanism for actuating and controlling the pusher blade 110. In said embodied form, means are provided for assisting the actuating mechanism already described at the beginning of the return or retractive movement of the pusher blade, and in this embodiment spring-operated means are provided for this purpose. As so embodied, two rods 200 and 201 are mounted on the back of the pusher blade, and are substantially horizontally and parallelly disposed. On the rod 200 is a loose sliding collar 202, to which is fixed one end of a helical spring 203, and the other end of the spring is attached at 204 at one of the rear bottom corners of the shovel. In like manner a loose sliding collar 205 is mounted on the rod 201, and one end of a helical spring 206 is attached to the collar, and the other end of the spring is attached at 207 in the opposite rear corner of the shovel.

When the pusher blade 110 has been pushed to its forward position, that is, to the end of its discharging stroke, as shown in Figs. 10 and 11, by its actuating mechanism, the springs 203 and 206 are under tension and act to draw the pusher blade backwardly, thus assisting the restoring mechanism when the levers 116 and 117 and 122 and 123 are nearly on the dead center.

As the pusher blade moves backwardly, the material entering the shovel serving to move the blade backwardly, the springs 203 become completely relaxed, and the collars 202 and 205 thereafter slide along their respective rods 200 and 201 during the remainder of the return or retractive movement of the pusher blade. During the discharging or outward movement of the blade the collars again slide along their rods until the springs begin to be under tension and the further movement of the pusher blade outwardly increases the tension in the springs, which tension is utilized in the return or retractive movement of the pusher blade, as already described.

Referring now to the embodied form of sliding mechanism for the pinion hub 179, this is preferably effected by a solenoid which in turn is controlled from a distant station as already described. A solenoid 212 is mounted upon a plate 213, which plate in turn is mounted on the side web of the bed plate 1 of the machine. The core 214 of the solenoid is pivotally connected at 215 to an arm 216. This arm is fixed to an arm 217, carried in a bearing 218 mounted on the bed plate 1.

Fixed also to shaft 217 is an arm 219. In engagement with the arm 219 is a pin 220, which pin projects outwardly from a lever 221, which lever is pivoted at 222 upon the pedestal or bearing block 130. The lever 221 at its upper end is formed into a yoke 223, which straddles in an annular groove in the hub 179. Lever 221 at its lower end is provided with a friction roller 224, with which cooperates a throw-out device comprising a cam 225 fixed on the hub 226, which hub is fixed on the shaft 124.

The mechanism just described operates to both throw-in and throw-out the gears. When the solenoid 212 is energized, arm 216 is pulled upwardly and thereby arm 219 is swung towards the bottom of the sheet in Figs. 10 and 11. This rocks lever 221 to throw in the hub 179 to operate the pusher blade. It will be noted that the mechanism effects but a partial rotation of the shaft 128. When cam 225 engages roller 224, lever 221 is rocked thereby and pinion 179 is thrown out.

Figures 13, 14, 15:
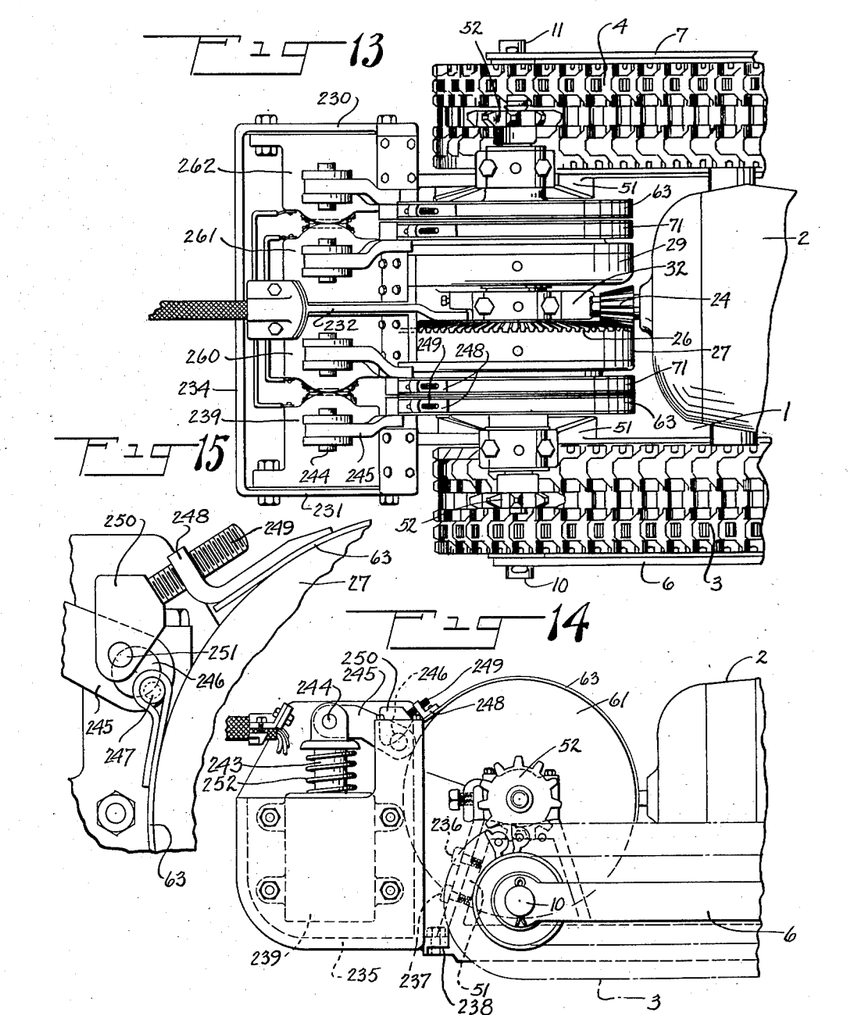
Fig. 13 is a fragmentary, top plan corresponding to the left-hand end of Fig. 2, and showing in addition some of the controlling solenoids and their mountings.
Fig. 14 is an elevation corresponding to Fig. 13.
Fig. 15 is a detached detail of the solenoid-operated brake-band actuating means.

In Figs. 13, 14 and 15 are shown the present preferred form of the solenoid-actuated controls for the brake bands 63 and 71 which control the operation and the direction of the traction treads. In said embodied form, a general support is provided having vertically-disposed side walls 230 and 231, and a central vertically-disposed partition 232, and a rear wall 234 with which these various partitions are united or integral. The support may also have a bottom or floor 235. This support is mounted at either side upon the standards or bearing blocks 51, and in the center upon standard or bearing block 32 (as appears from Figs. 13 and 14) and is secured thereto by bolts 236 and 237, and has seats 238 upon the bed plate.

Mounted upon the side wall 231 is a solenoid 239, the core 243 of which is pivoted at 244 to a lever 245, which lever is pivoted at 246 upon the support. One end of the brake band 63 is attached to a pin 247, fixed to the lever 245. The other end of the brake band is fixed to a lug 248, having screw-threaded engagement with the screw-threaded pin 249. Pin 249 is fixed to a yoke head 250, having a pivotal connection 251 with the lever 245. The solenoid core 243 has a restoring spring 252 coiled thereabout.

The other solenoids 260 and 261 are mounted upon the central plate 232 of the support and the remaining solenoid 262 is mounted upon the other side plate 230 of the support. Their manner of operation and construction is the same or similar to that already described and detailed description is unnecessary. All the various solenoids may be controlled and operated from a distant, non-traveling station, as shown and described in my application Ser. No. 445,701, if desired.

From all the foregoing it will be understood that a machine and mechanism have been provided realizing the objects and advantages hereinbefore set forth, together with other objects and advantages; and that changes may be made from the exact structure shown and described, within the scope of the accompanying claims, without departing from the principles of the invention and without sacrificing its chief advantages.

What I claim is:

1. A material handling machine for use in thin coal seams including in combination a machine body, a traction tread at either side thereof, driving means engaging the treads, a shovel extending forwardly from the front of the body, a motor on the bed on substantially the same level with the shovel, a speed reduction and direction reversing gearing connected to the motor shaft and to the driving means for the treads, and means for discharging the load of material from the shovel.

2. A material handling machine for use in thin coal seams including in combination a machine body, a traction tread at either side thereof, driving means engaging the treads, a shovel extending forwardly from the front of the body, a motor on the bed between the traction treads and on substantially the same level as the shovel, a speed reduction and direction reversing gearing connected to the motor shaft and to the driving means for the treads, including separate direction reversing devices for the two treads, whereby the machine may be swung about a point within itself as a pivot, and means for discharging the load of material from the shovel.

3. A material handling machine for use in thin coal seams including in combination a machine body, a traction tread at either side thereof, driving means engaging the treads, a shovel extending forwardly from the front of the body, arms for supporting the shovel extending backwardly therefrom and mounted on the rear of the machine body, a motor on the bed, a speed reduction and direction reversing gearing mechanism for each of the treads, each of said mechanisms being connected to the motor shaft and to the driving means for its tread, and means for discharging the load of material from the shovel.

4. A material handling machine for use in thin coal seams including in combination a machine body, a traction tread at either side thereof, driving means engaging the treads, a shovel loadable and unloadable while remaining in the same horizontal plane extending forwardly from the front of the body and as wide as the machine body, a motor on the bed on substantially the same level with the shovel, a speed reduction and direction reversing gearing connected to the motor shaft and to the driving means for the treads, and means for discharging the load of material from the shovel.

5. A material handling machine for use in thin coal seams including in combination a machine body, a traction tread at either side thereof, driving means engaging the treads, a shovel extending forwardly from the front of the body and as wide as the machine body, a motor on the bed between the traction treads and on substantially the same level as the shovel, a speed reduction and direction reversing gearing connected to the motor shaft and to the driving means for the treads, including separate direction reversing devices for the two treads, and means for discharging the load of material from the shovel.

6. A material handling machine for use in thin coal seams including in combination a machine body, a traction tread at either side thereof, driving means engaging the treads, a shovel loadable and unloadable while remaining in the same horizontal plane extending forwardly from the front of the body and as wide as the machine body and the treads, arms for supporting the shovel extending backwardly therefrom and mounted on the rear of the machine body, a motor on the bed, a speed reduction and direction reversing gearing connected to the motor shaft and to the driving means for the treads, and means for discharging the load of material from the shovel.

7. A material handling machine for use in thin coal seams including in combination a machine body, a traction tread at either side thereof, driving means engaging the treads, a shovel extending forwardly from the front of the body and as wide as the machine body and the treads, arms for supporting the shovel extending backwardly therefrom outside of the traction treads and mounted on the rear of the machine body, a motor on the bed, a speed reduction and direction reversing gearing connected to the motor shaft and to the driving means for the treads, including separate direction reversing devices for the two treads, whereby the machine may be swung about a point within itself as a pivot, and means for discharging the load of material from the shovel.

8. A material handling machine for use in thin coal seams including in combination a machine body, a traction tread at either side thereof, driving means engaging the treads, a shovel extending forwardly from the front of the body, arms attached to the lower edge of the shovel and extending backwardly for substantially the entire length of the machine body outside of the traction treads and having their rear ends mounted on the rear of the machine body, a motor on the bed, and a speed reduction and direction reversing gearing connected to the motor shaft and to the driving means for the treads for driving the machine forwardly or backwardly or for swinging it about a vertical pivot.

9. A material handling machine for use in thin coal seams including in combination a machine body, a traction tread at either side thereof, driving means engaging the treads, a shovel extending forwardly from the front of the body, arms for supporting the shovel extending backwardly therefrom and mounted on the rear of the machine body, a motor on the bed on substantially the same level with the shovel, and a speed reduction and direction reversing gearing connected to the motor shaft and to the driving means for the treads, including separate direction reversing devices for the two treads, whereby the machine may be swung about a point within itself as a pivot.

10. A material handling machine for use in thin coal seams including in combination a machine body, a traction tread at either side thereof, driving means engaging the treads, a shovel extending forwardly from the front of the body, arms for supporting the shovel extending backwardly therefrom outside of the traction treads and mounted on the rear of the machine body, a motor on the bed between the traction treads and on substantially the same level as the shovel, a speed reduction and direction reversing gearing connected to the motor shaft and to the driving means for the treads, a pusher blade within the shovel and means including speed reduction gearing connected to the motor shaft for actuating the pusher blade to discharge the load from the shovel.

11. A material handling machine for use in thin coal seams including in combination a machine body, a traction tread at either side thereof, driving means engaging the treads, a shovel extending forwardly from the front of the body, arms attached to the lower edge of the shovel and extending backwardly for substantially the entire length of the machine body outside of the traction treads and having their rear ends mounted on the rear of the machine body, a motor on the bed between the traction treads and on substantially the same level as the shovel, a speed reduction and direction reversing gearing connected to the motor shaft and to the driving means for the treads, including separate direction reversing devices for the two treads whereby the machine may be swung about a point within itself as a pivot, a pusher blade within the shovel and means including speed reduction gearing connected to the motor shaft for actuating the pusher blade to discharge the load from the shovel.

12. A material handling machine including in combination a machine body, a traction tread at either side thereof, driving means engaging the treads, a shovel extending forwardly from the front of the body, a motor on the bed between the traction treads and on substantially the same level as the shovel, a speed reduction and direction reversing gearing connected to the motor shaft and to the driving means for the treads, a pusher blade within the shovel, blade operating arms connected to the pusher blade, a shaft to which the arms are fixed and speed reduction gearing for rotating the shaft and connected to the motor shaft.

13. A material handling machine including in combination a machine body, a traction tread at either side thereof, driving means engaging the treads, a shovel extending forwardly from the front of the body, arms for supporting the shovel extending backwardly therefrom and mounted on the rear of the machine body, a motor on the bed between the traction treads and on substantially the same level as the shovel, a speed reduction and direction reversing gearing connected to the motor shaft and to the driving means for the treads, including separate direction reversing devices for the two treads, a pusher blade within the shovel, blade operating arms connected to the pusher blade, a shaft to which the arms are fixed and speed reduction gearing for rotating the shaft and connected to the motor shaft.

14. A material handling machine including in combination a machine body, a traction tread at either side thereof, driving means engaging the treads, a shovel extending forwardly from the front of the body, a motor on the bed between the traction treads and on substantially the same level as the shovel, a speed reduction and direction reversing gearing connected to the motor shaft and to the driving means for the treads, including separate direction reversing devices for the two treads for driving the machine forwardly or backwardly or for swinging it about a vertical pivot, and means for discharging the load of material from the shovel.

15. A material handling machine including in combination a mchine body, a traction tread at either side thereof, driving means engaging the treads, a shovel extending forwardly from the front of the body and as wide as the machine body and the treads, arms for supporting the shovel extending backwardly therefrom and mounted on the rear of the machine body, a motor on the bed, a speed reduction and direction reversing gearing connected to the motor shaft and to the driving means for the treads, and means for discharging the load of material from the shovel.

16. A material handling machine including in combination a machine body, a traction tread at either side thereof, driving means engaging the treads, a shovel loadable and unloadable while remaining in the same horizontal plane extending forwardly from the front of the body, arms for supporting the shovel extending backwardly therefrom and mounted on the rear of the machine body, a motor on the bed on substantially the same level with the shovel, a speed reduction and direction reversing gearing connected to the motor shaft and to the driving means for the treads, a pusher blade within the shovel and means including speed reduction gearing connected to the motor shaft for actuating the pusher blade to discharge the load from the shovel.

17. A material handling machine including in combination a machine body, a traction tread at either side thereof, driving means engaging the treads, a shovel extending forwardly from the front of the body, arms for supporting the shovel extending backwardly therefrom and mounted on the rear of the machine body, a motor on the bed, a speed reduction and direction reversing gearing connected to the motor shaft and to the driving means for the treads, a pusher blade within the shovel and means including blade operating arms connected to the pusher blade for operating it, a shaft to which the arms are fixed and speed reduction gearing for rotating the shaft and connected to the motor shaft.

18. A material handling machine including in combination a machine body, a traction tread at either side thereof, driving means engaging the treads, a shovel extending forwardly from the front of the body, a motor and motor shaft disposed longitudinally on the body, a pusher blade within the shovel, a high ratio speed reduction gearing connected to the forward end of the motor shaft, connections therefrom for actuating the pusher blade to discharge the shovel, speed reducing and direction reversing gearing connected to the rear end of the motor shaft and connections therefrom for driving the traction treads.

19. A material handling machine including in combination a machine body, a traction tread at either side thereof, driving means engaging the treads, a shovel extending forwardly from the front of the body, a motor and motor shaft disposed longitudinally on the body, a pusher blade within the shovel, and a high ratio speed reduction gearing connected to the forward end of the motor shaft, connections therefrom for actuating the pusher blade to discharge the shovel, and speed reducing and direction reversing gearing connected to the rear end of the motor shaft, including separate direction reversing devices for each of the treads and connections therefrom for driving the traction treads for driving the machine forwardly or backwardly or for swinging it about a vertical pivot.

20. A material handling machine including in combination a machine body, a traction tread at either side thereof, driving means engaging the treads, a shovel extending forwardly from the front of the body, arms for supporting the shovel extending backwardly therefrom and mounted on the rear of the machine body, a motor and motor shaft disposed longitudinally on the body, a pusher blade within the shovel, and a high ratio means engaging the treads, a shovel loadable and unloadable while remaining in the same horizontal plane extending forwardly from the front of the body, a motor and motor shaft disposed longitudinally on the body, a pusher blade within the shovel, a high ratio speed reduction gearing connected to the forward end of the motor shaft, connections therefrom for driving the traction treads.

21. A material handling machine including in combination a machine body, a traction tread at either side thereof, driving means engaging the treads, a shovel loadable and unloadable while remaining in the same horizontal plane extending forwardly from the front of the body, a motor and motor shaft disposed longitudinally on the body, a pusher blade within the shovel, a high ratio speed reduction gearing connected to the forward end of the motor shaft, connections therefrom for actuating the pusher blade to discharge the shovel, and speed reducing and direction reversing gearing connected to the rear end of the motor shaft, including separate direction reversing devices for each of the treads and connections therefrom for driving the traction treads.

22. A material handling machine including in combination a machine body, a traction tread at either side thereof, driving means engaging the treads, a shovel loadable and unloadable while remaining in the same horizontal plane extending forwardly from the front of the body and as wide as the machine body and the treads, arms for supporting the shovel extending backwardly therefrom outside of the traction treads and mounted on the rear of the machine body, a motor and motor shaft disposed longitudinally on the body, a pusher blade within the shovel, a high ratio speed reduction gearing connected to the forward end of the motor shaft, connections therefrom for actuating the pusher blade to discharge the shovel, speed reducing and direction reversing gearing connected to the rear end of the motor shaft and connections therefrom for driving the traction treads.

23. A material handling machine including in combination a machine body, a traction tread at either side thereof, driving means engaging the treads, a shovel loadable and unloadable while remaining in the same horizontal plane extending forwardly from the front of the body and as wide as the machine body and the treads, arms for supporting the shovel extending backwardly therefrom outside of the traction treads and mounted on the rear of the machine body, a motor and motor shaft disposed longitudinally on the body between the traction treads and on substantially the same level as the shovel, a pusher blade within the shovel, a high ratio speed reduction gearing connected to the forward end of the motor shaft, connections therefrom for actuating the pusher blade to discharge the shovel, speed reducing and direction reversing gearing connected to the rear end of the motor shaft, including separate direction reversing devices for each of the treads, and connections therefrom for driving the traction treads.

24. A material handling machine including in combination a machine body, a traction tread at either side thereof, driving means engaging the treads, a shovel loadable and unloadable while remaining in the same horizontal plane extending forwardly from the front of the body and as wide as the machine body and the treads, a motor and motor shaft disposed longitudinally on the body, a pusher blade within the shovel, and a high ratio speed reduction gearing connected to the forward end of the motor shaft, and connections therefrom for actuating the pusher blade to discharge the shovel, and speed reducing and direction reversing gearing connected to the rear end of the motor shaft and connections therefrom for driving the traction treads.

25. A material handling machine including in combination a machine body, a traction tread at either side thereof, driving means engaging the treads, a shovel extending forwardly from the front of the body, a motor and motor shaft disposed longitudinally on the body, a pusher blade within the shovel, a high ratio speed reduction gearing connected to the forward end of the motor shaft, connections therefrom for actuating the pusher blade to discharge the shovel, speed reducing and direction reversing gearing connected to the rear end of the motor shaft and connections therefrom for driving the traction treads, and including two independently rotatable shafts connected to the respective traction treads.

26. A material handling machine including in combination a machine body, a traction tread at either side thereof, driving means engaging the treads, a shovel extending forwardly from the front of the body, shovel supporting arms secured to the shovel and mounted on the rear of the frame, a motor and motor shaft disposed longitudinally on the body, a pusher blade within the shovel, and a high ratio speed reduction gearing connected to the forward end of the motor shaft, and connections therefrom for actuating the pusher blade to discharge the shovel, and speed reducing and direction reversing gearing connected to the rear end of the motor shaft, including separate direction reversing devices for each of the treads and connections therefrom for driving the traction treads, including two independently rotatable shafts connected to the respective traction treads.

27. A material handling machine including in combination a machine body, a traction tread at either side thereof, driving means engaging the treads, a shovel extending forwardly from the front of the body, arms for supporting the shovel extending backwardly therefrom and mounted on the rear of the machine body, a motor on the bed between the traction treads and on substantially the same level as the shovel, a speed reduction and direction reversing gearing connected to the motor shaft and to the driving means for the treads, and including two independently rotatable shafts and connections therefrom for driving the respective traction treads for driving the machine forwardly or backwardly or for swinging it about a vertical pivot.

28. A material handling machine including in combination a machine body, a traction tread at either side thereof, driving means engaging the treads, a shovel extending forwardly from the front of the body, arms for supporting the shovel extending backwardly therefrom outside of the traction treads and mounted on the rear of the machine body, a motor on the bed between the traction treads and on substantially the same level as the shovel, a speed reduction and direction reversing gearing connected to the motor shaft and to the driving means for the treads, and including two independently rotatable shafts and connections therefrom for driving the respective traction treads, whereby the machine may be swung about a point within itself as a pivot, and means for discharging the load of material from the shovel.

29. A material handling machine for use in thin coal seams including in combination a machine body, a traction tread at either side thereof, a shovel at the front end thereof, a pair of shafts extending transversely of the machine for driving the traction treads, and speed reducing and direction reversing gearing coaxial with the shafts, for driving them.

30. A material handling machine for use in thin coal seams including in combination a machine body, a traction tread at either side thereof, a shovel at the front end thereof, a pair of shafts on substantially the same level with the shovel extending transversely of the machine for driving the traction treads, and speed reducing and direction reversing gearing coaxial with the shafts, for driving them independently.

31. A material handling machine for use in thin coal seams including in combination a machine body, a traction tread at either side thereof, a shovel at the front end thereof, a pair of shafts between the traction treads and on substantially the same level as the shovel extending transversely of the machine for driving the traction treads, and speed reducing and direction reversing gearing coaxial with the shafts, for driving them in the same or opposite directions.

32. A material handling machine for use in thin coal seams including in combination a machine body, a traction tread at either side thereof, a shovel at the front end thereof, arms for supporting the shovel extending backwardly therefrom and mounted on the rear of the machine body, a pair of shafts extending transversely of the machine for driving the traction treads, and speed reducing and direction reversing gearing coaxial with the shafts, for driving them independently in the same or opposite directions.

33. A material handling machine for use in thin coal seams including in combination a machine body, a traction tread at either side thereof, a shovel at the front end thereof, a pair of shafts extending transversely of the machine for driving the traction treads on substantially the same level with the shovel, gearing for two speed reducing and direction reversing gearings for the two shafts and coaxial therewith, and a pair of housings for the gears, connected together for common rotation.

34. A material handling machine for use in thin coal seams including in combination a machine body, a traction tread at either side thereof, a shovel at the front end thereof, a pair of shafts extending transversely of the machine for driving the traction treads between the traction treads and on substantially the same level as the shovel, gearing for two speed reducing and direction reversing gearings for the two shafts and coaxial therewith, a pair of housings for the gears, connected together for common rotation, and a single gear for driving the housings.

35. A material handling machine for use in thin coal seams including in combination a machine body, a traction tread at either side thereof, a shovel at the front end thereof, arms for supporting the shovel extending backwardly therefrom and mounted on the rear of the machine body, a pair of shafts extending transversely of the machine for driving the traction treads, gearing for two speed reducing and direction reversing gearings for the two shafts and coaxial therewith, for driving the shafts in the same or opposite directions, and a pair of housings for the gears, connected together for common rotation.

36. A material handling machine for use in thin coal seams including in combination a machine body, a traction tread at either side thereof, a shovel at the front end thereof, arms for supporting the shovel extending backwardly therefrom outside of the traction treads and mounted on the rear of the machine body, a pair of shafts extending transversely of the machine for driving the traction treads between the traction treads and on substantially the same level as the shovel, gearing for two speed reducing and direction reversing gearings for the two shafts and coaxial therewith, for driving the shaft independently in either direction, and a pair of housings for the gears, connected together for common rotation.

In testimony whereof, I have signed my name to this specification.

KENNETH DAVIS.